Nov. 29, 1960 E. P. HALLIGAN 2,962,140
DIE HEAD
Filed Sept. 12, 1958 3 Sheets-Sheet 1

Inventor:
Eugene P. Halligan,

Nov. 29, 1960 E. P. HALLIGAN 2,962,140
DIE HEAD
Filed Sept. 12, 1958 3 Sheets-Sheet 2

Inventor:
Eugene P. Halligan,
By Schraeder, Hofgren,
Brady & Wegner, Attys.

Nov. 29, 1960  E. P. HALLIGAN  2,962,140
DIE HEAD
Filed Sept. 12, 1958  3 Sheets-Sheet 3

Inventor:
Eugene P. Halligan,
By Schneider, Hofgren,
Brady & Wegner, Attys.

United States Patent Office 2,962,140
Patented Nov. 29, 1960

2,962,140

DIE HEAD

Eugene P. Halligan, Chicago, Ill., assignor to Nye Tool Company, a corporation of Illinois Filed Sept. 12, 1958, Ser. No. 760,636

2 Claims. (Cl. 192—43.2)

This invention relates to improvements in die head assemblies, and particularly to improved means for retaining the drive ring on the die head and positioning the thread cutting chasers.

One object of the invention is to provide a die head in which the ratchet drive ring is retained against accidental axial movement and yet is quickly and easily removable. This is accomplished by spring pressed ball assemblies in the die head body engaging one of a pair of grooves in the interior of the drive ring. This construction retains the ring in a driving position on the body and allows the operator to easily mount or remove the drive ring without having to a remove a retaining plate, screws or other attaching means.

Another object of the invention is to provide a die head and drive ring of such construction that the drive ring may be mounted with either of its radial faces abutting the die head shoulder.

A further object of the invention is to provide means for positioning and locking the thread cutting chasers against movement in any direction.

Other objects, features and advantages of the present invention will be apparent from the following description of a preferred embodiment, illustrated by the accompanying drawings in which.

Generally the die head assembly comprises a body which holds thread cutting chasers, a positioning ring for locking the chasers against movement and a ratchet drive ring for transmitting rotary force to the body.

Figures 1, 2:
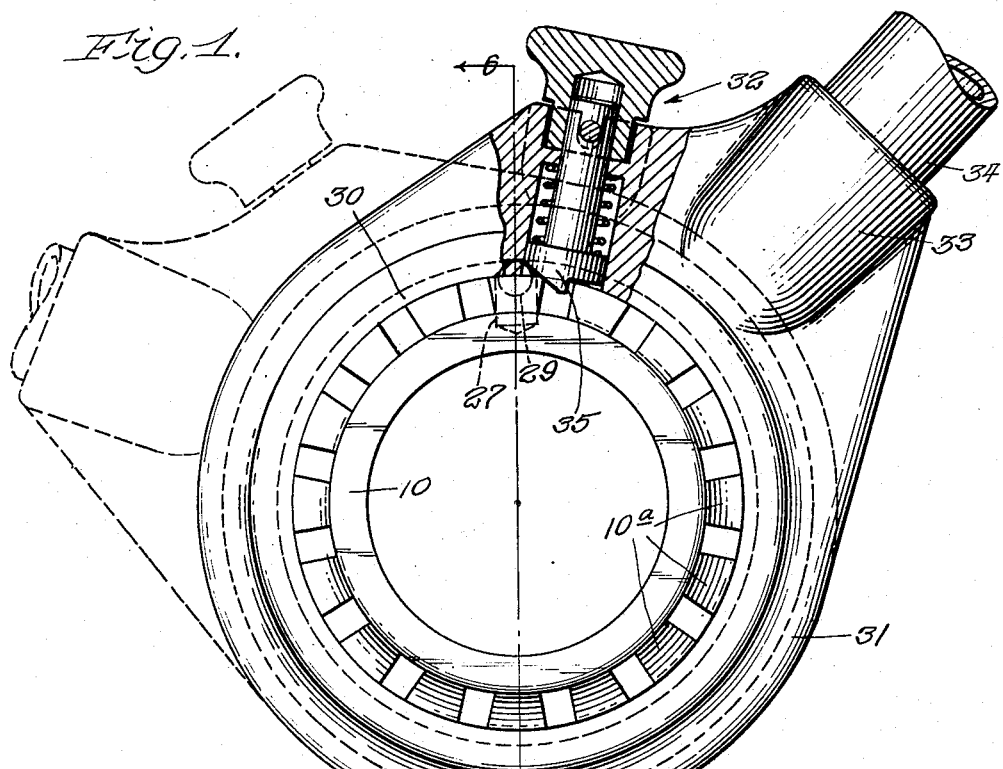
Fig. 1 is an end elevational view of a die head embodying the invention, with the pawl subassembly in section.
Fig. 2 is a side elevational view of the die head assembly.
Figure 3:
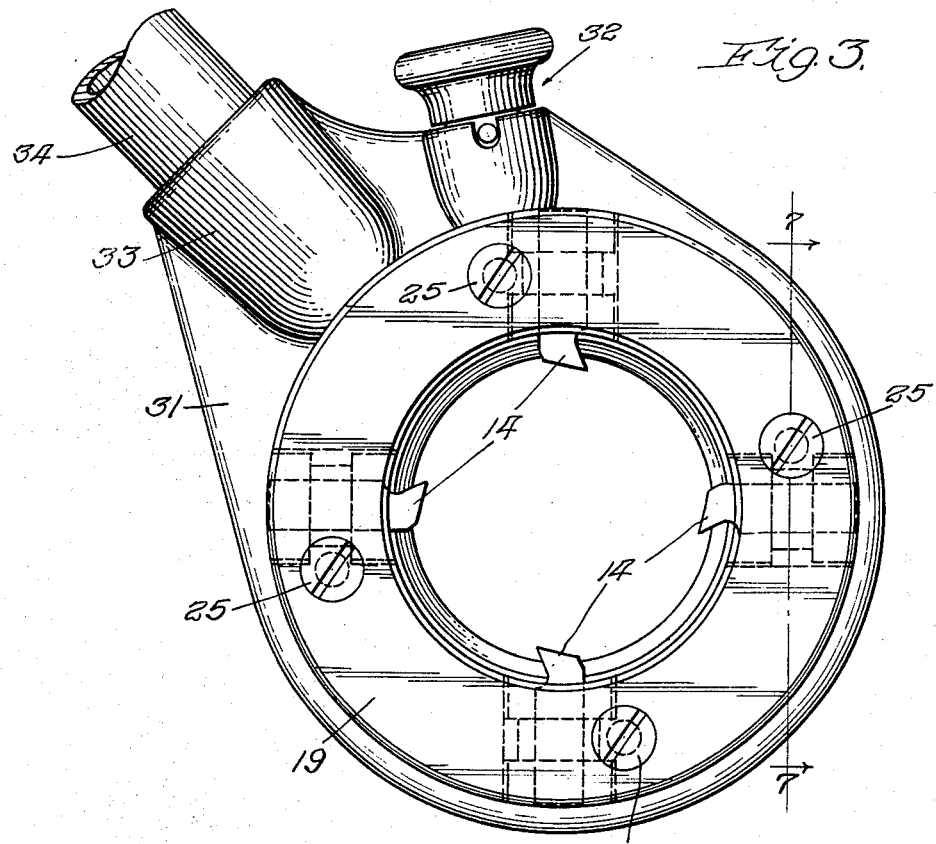
Fig. 3 is an end elevational view, viewing the assembly from the thread cutting end.
Figure 4:
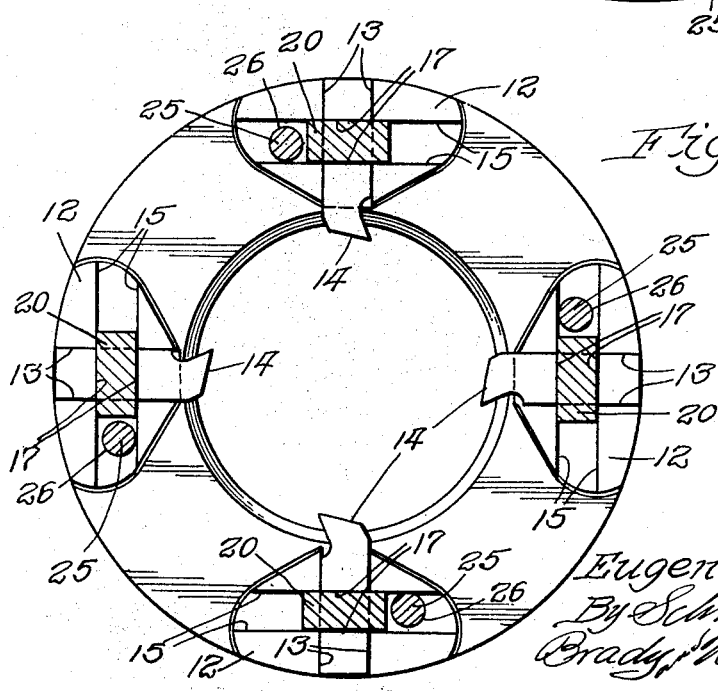
Fig. 4 is a sectional view taken substantially as indicated along line 4—4 of Fig. 2.
Figure 6:
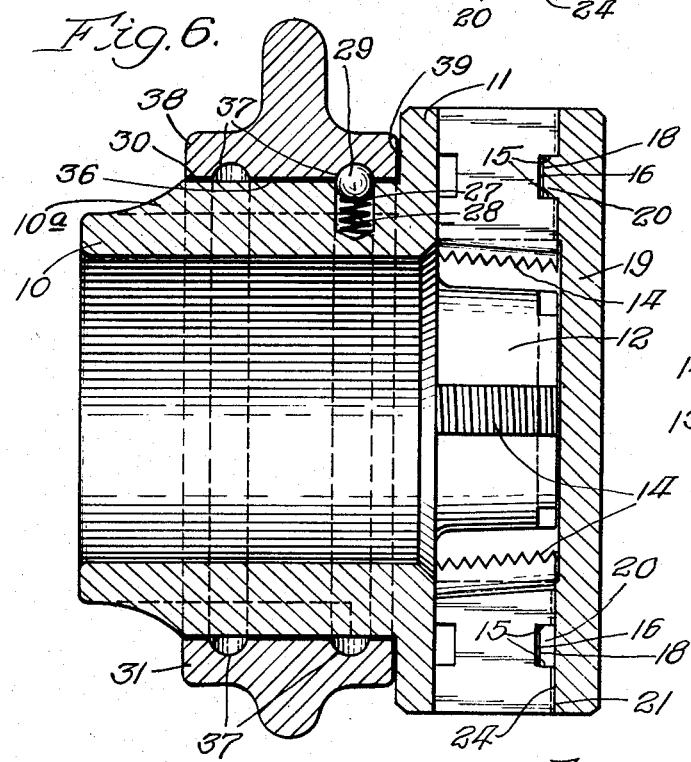
Fig. 6 is a longitudinal median section of the assembly taken substantially as indicated along line 6—6 of Fig. 1.

More specifically, and as best seen in Fig. 6, the body is integrally formed and comprises a splined sleeve 10, an external circumferential shoulder 11 on the sleeve and spaced from the inner ends of splines 10a, and four coaxially extending chaser mounting posts 12 (Figs. 2 and 4). The posts have radially extending channels 13 machined into them for receiving thread cutting chasers 14, the fit of the chasers being close and the posts 12 taking up side forces executed on the chasers when cutting. Each post is further provided with a shallow positioning slot 15 normal to chaser channels 13 and formed with a substantially flat bottom surface 16.

Each chaser 14 has a positioning slot 17 which has a flat bottom 18 and is normal to channel 13 and aligned with positioning slot 15 of the post when the chaser is properly positioned in the post.

Figure 5:
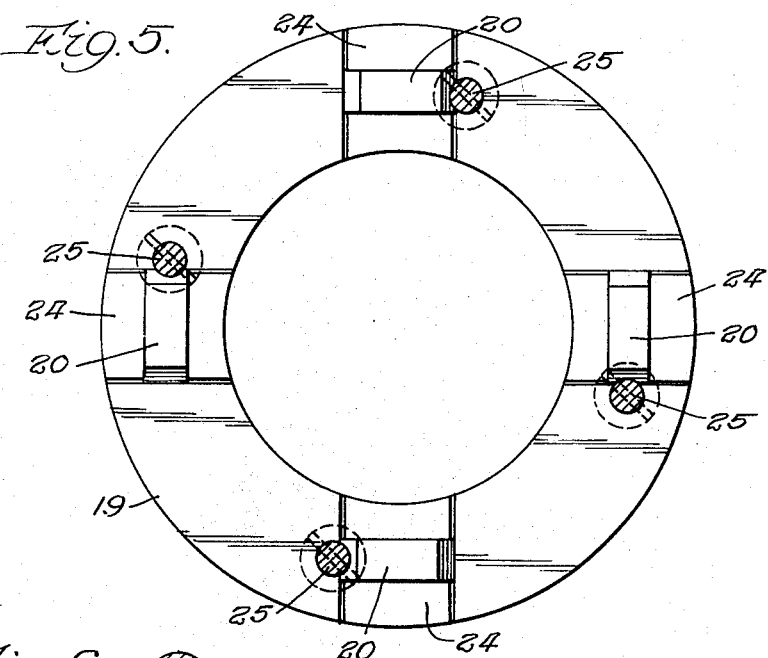
Fig. 5 is a bottom plan view of the positioning ring, taken substantially as indicated along line 5—5 of Fig. 2.
Figure 7:
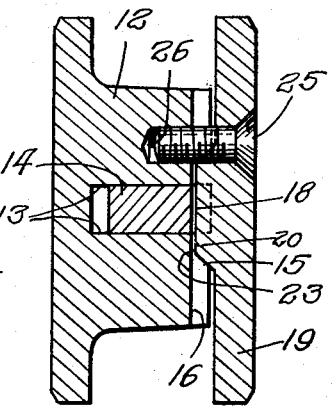
Fig. 7 is a fragmentary section on an enlarged scale, taken substantially as indicated along line 7—7 of Fig. 3.

A positioning ring 19 is best seen in Figs. 2 and 5 to have four lugs 20 which are machined to fit closely in the aligned positioning slots 15 in the posts and 17 in the chasers. The lugs 20 are of sufficient length to extend on either side of the chaser positioning slot 17 and into the post positioning slot 15. The lugs 20 are seen in section in Fig. 4, and by engaging the aligned positioning slots of the post and chaser, they lock the chaser solidly against radial movement in either direction. The upper surface 21 of the chaser, as seen in Fig. 2, extends slightly beyond the end surface 22 of the post, and the flat bottom 18 of the chaser positioning slot is likewise slightly above the flat bottom 16 of the post positioning slot 15 when the chasers 14 are positioned in the channels. Lugs 20 have flat bottom surfaces 23 which abut surfaces 18 of the chasers, and the squared, machined surface 24 of the positioning ring abuts the upper surface 21 of the chaser when the ring 19 is fastened in place, securing the chasers against longitudinal movement. As best seen in Fig. 7, the positioning ring 19 is fastened by screws 25 countersunk into the outer surface of the ring and screw threaded into holes 26 in the posts 12, retaining the chasers against axial movement and securing the lugs firmly in the positioning slots 15 and 17.

The splined sleeve 10 is provided with a hole 27 which is spaced from circumferential shoulder 11, and contains a compression spring 28 and ball 29, the ball protruding above the outer surface 30 of the sleeve 10, as shown in Fig. 6.

Mounted on splined sleeve 10 is a ratchet drive ring 31 containing a pawl subassembly, designated generally by the numeral 32, and a handle socket 33, to receive a threaded handle 34 (seen fragmentarily in Fig. 1) for application of rotary force. The pawl subassembly 32, which may be reversible as shown in Fig. 1, has a pawl 35 engaging splines 10a to transmit the rotary force to the body of the die head.

The inner surface 36 of drive ring 31 has two substantially parallel, circumferential grooves 37, the two grooves being the same distance from the nearest radial faces 38 and 39 of the ring 31. In mounting the drive ring 31 on splined sleeve 10, the protruding ball 29 engages either of the inner grooves 37 of the ring, depending on which of the radial faces of the ring 31 is mounted adjacent to the body shoulder 11. The spring 28 keeps tension on the ball 29 in the groove to prevent the drive ring 31 from accidentally slipping off the sleeve 10, and yet permitting rotary motion of the ring around the sleeve. Because grooves 37 are substantially equidistant from the radial faces 38 and 39 of the drive ring, the ring can be mounted with either radial face adjacent to the body shoulder 11. Mounting or remounting the drive ring is thus a quick and easy operation, requiring no retaining plate, screws or pins to keep the drive ring on the sleeve; and may be accomplished without attention as to which face of the ring is against shoulder 11, since pawl 33 is engaged with splines 10a either way.

The foregoing detailed description is given for clearness of understanding only and no unnecessary limitations are to be understood therefrom, as modifications will be obvious to those skilled in the art.

I claim:

1. In a die head assembly, in combination: an elongated, annular body with a pawl engaging, splined sleeve at one end and integral mounting means for thread cutting means at the other end, there being an external circumferential shoulder on said body between the mounting means and the splines; a spring pressed ball assembly in said body positioned between the shoulder and said splines, the ball in said assembly extending outside the outer surface of the sleeve; a ratchet drive ring rotatably mounted on said sleeve, said ring having parallel, radial faces and a pair of internal, parallel, circumferential grooves, each groove being so spaced from one of said faces that it is engaged by the spring pressed ball when one of said faces is against the shoulder, whereby the ring may be mounted with either face against the shoulder; and ratchet pawl means in said ring engageable with the splines in either position of the ring.

2. In a die head assembly, in combination: an elongated, annular body with a pawl engaging, splined sleeve at one end and integral mounting means for thread cutting means at the other end, there being an external circumferential shoulder on said body between the mounting means and the splines; a spring pressed ball assembly in said body positioned between the shoulder and said splines, the ball in said assembly extending outside the outer surface of the sleeve; a ratchet drive ring rotatably mounted on said sleeve, said ring having parallel, radial faces and a pair of internal, parallel, circumferential grooves, each groove being so spaced from one of said faces that it is engaged by the spring pressed ball when one of said faces is against the shoulder, whereby the ring may be mounted with either face against the shoulder; and ratchet pawl means in said ring between said grooves engageable with the splines in either position of the ring.

References Cited in the file of this patent

UNITED STATES PATENTS

| | | |
|---|---|---|
| 1,418,323 | Nonneman | June 6, 1922 |
| 1,441,120 | Schmieding | Jan. 2, 1923 |
| 2,281,300 | Waldo | Apr. 28, 1942 |
| 2,600,776 | Ingwer | June 17, 1952 |
| 2,792,094 | Baldwin | May 14, 1957 |

FOREIGN PATENTS

| | | |
|---|---|---|
| 496,006 | Germany | Apr. 12, 1930 |
| 1,181,417 | France | Jan. 12, 1959 |